(12) United States Patent
McClenny et al.

(10) Patent No.: US 8,407,736 B2
(45) Date of Patent: Mar. 26, 2013

(54) APPARATUS AND METHOD FOR PROVIDING EMERGENCY COMMUNICATIONS

(75) Inventors: John McClenny, San Antonio, TX (US); Andrew J. Augustine, Helotes, TX (US); Mary McCarthy, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 309 days.

(21) Appl. No.: 12/849,854

(22) Filed: Aug. 4, 2010

(65) Prior Publication Data

US 2012/0036529 A1    Feb. 9, 2012

(51) Int. Cl.
*H04N 7/10*    (2006.01)
(52) U.S. Cl. .................... 725/33; 455/404.1; 340/286.02
(58) Field of Classification Search .................... 725/33; 704/2; 455/404.1, 404.2; 340/286.02
See application file for complete search history.

(56) References Cited

U.S. PATENT DOCUMENTS

| | | | |
|---|---|---|---|
| 7,515,036 B2 | 4/2009 | McClenny et al. | |
| 2007/0047520 A1* | 3/2007 | Byers et al. | 370/352 |
| 2007/0136743 A1* | 6/2007 | Hasek et al. | 725/33 |
| 2007/0237318 A1* | 10/2007 | McGary | 379/114.15 |
| 2007/0296575 A1 | 12/2007 | Eisold et al. | |
| 2008/0059998 A1* | 3/2008 | McClenny et al. | 725/33 |
| 2008/0086754 A1* | 4/2008 | Chen et al. | 725/105 |
| 2010/0146541 A1 | 6/2010 | Velazquez | |

* cited by examiner

*Primary Examiner* — Farzana Hossain
(74) *Attorney, Agent, or Firm* — Guntin & Gust, PLC; Andrew Gust

(57) ABSTRACT

A system that incorporates teachings of the present disclosure may include, for example, a server having a controller operable to monitor for emergency messages over a broadcast network and over the Internet, obtain an emergency message based on the monitoring where the emergency message comprises text data, audio data, schedule data and location data and where the text and audio data correspond to a plurality of languages, generate an alert message comprising the schedule data, the location data and at least a portion of the plurality of languages of the text and audio data, and multicast the alert message over an Internet Protocol Television network to a plurality of set top boxes, wherein each of the set top boxes presents a text alert that is synchronized with an audio alert based on the multicast alert message when the location data corresponds with a location of the set top box. Other embodiments are disclosed.

20 Claims, 9 Drawing Sheets

300

Communication Devices

700

800

900

1000

1100

APPARATUS AND METHOD FOR PROVIDING EMERGENCY COMMUNICATIONS

FIELD OF THE DISCLOSURE

The present disclosure relates generally to communication systems and more specifically to an apparatus and method for providing emergency communications.

BACKGROUND

Television and other media consumption devices provide a source of communication for government officials to provide emergency alerts and information. Most emergency alerts pertain to a specific geographic location. However, viewers may receive emergency alerts that do not apply to them due to the size of television viewing areas which may not correspond to the geographic location of the alert.

Emergency alerts include information that is desirable to disseminate to the public quickly and clearly. Providing information in a form that is more readily understood by a viewer can be beneficial in protecting public safety.

DETAILED DESCRIPTION

One embodiment of the present disclosure can entail a server comprising a controller operable to monitor for emergency messages over a broadcast network and over the Internet, and obtain an emergency message based on the monitoring. The emergency message can include text data, audio data, schedule data and location data, where the text and audio data correspond to a plurality of languages. The controller can be operable to generate an alert message comprising the schedule data, the location data and at least a portion of the plurality of languages of the text and audio data. The controller can also be operable to multicast the alert message over an Internet Protocol Television network to a plurality of set top boxes, where each of the set top boxes presents a text alert that is synchronized with an audio alert based on the multicast alert message when the location data corresponds with a location of the set top box. Each of the set top boxes can present the text and audio alerts corresponding to a language selected from the at least a portion of the plurality of languages. Each of the set top boxes can present the text and audio alerts according to a schedule determined from the schedule data.

One embodiment of the present disclosure can entail a non-transitory computer-readable storage medium operating in a set top box, comprising computer instructions to receive a multicast of an alert message over an Internet Protocol Television network. The alert message can include location data and a plurality of languages of text and audio data. The storage medium can include computer instructions to select a language from the plurality of languages of the text and audio data, and present text and audio alerts in the selected language based on the multicast alert message when the location data corresponds with a location of the set top box.

One embodiment of the present disclosure can entail a method including obtaining an emergency message comprising emergency information and location data, and obtaining text and audio data corresponding to a plurality of languages representative of the emergency message. The method can include generating an alert message comprising the location data and at least a portion of the plurality of languages of the text and audio data. The method can also include multicasting the alert message to a plurality of communication devices, where each of the communication devices presents a text alert that is synchronized with an audio alert based on the multicast alert message when the location data corresponds with a location of the communication device. Each of the communication devices can present the text and audio alerts corresponding to a language selected from the at least a portion of the plurality of languages.

Figure 1:
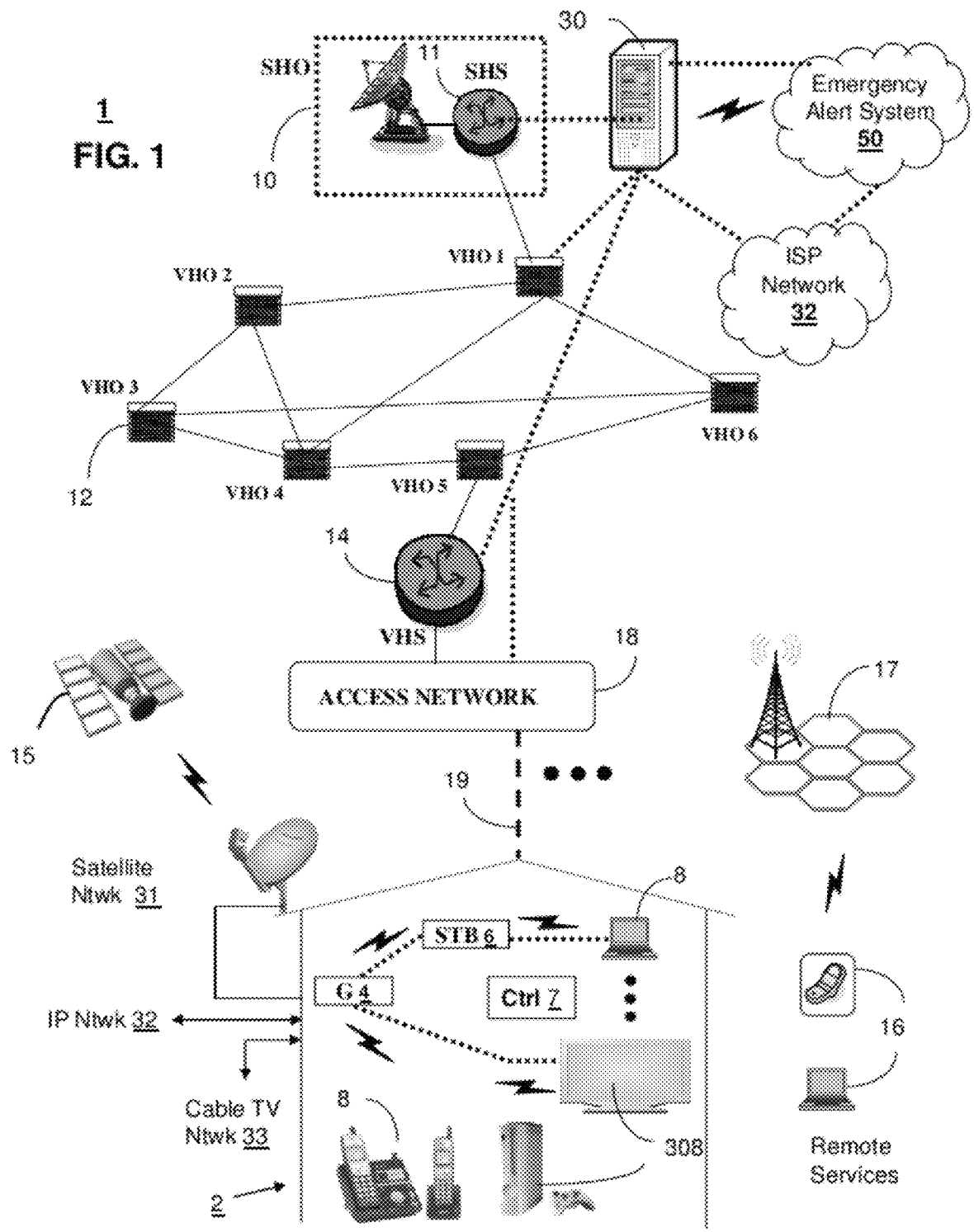
FIGS. 1-3 and 6 depict illustrative embodiments of communication systems that provide media services and emergency information.

FIG. 1 depicts an illustrative embodiment of a first communication system 1 for delivering media content. The communication system 1 can represent an Internet Protocol Television (IPTV) broadcast media system although other media broadcast systems are contemplated by the present disclosure in combination with or in place of the IPTV system. The IPTV media system can include a super head-end office (SHO) 10 with at least one super headend office server (SHS) 11 which receives media content from satellite and/or terrestrial communication systems. In the present context, media content can represent audio content, moving image content such as videos, still image content, or combinations thereof. The SHS server 11 can forward packets associated with the media content to video head-end servers (VHS) 14 via a network of video head-end offices (VHO) 12 according to a common multicast communication protocol.

The VHS 14 can distribute multimedia broadcast programs via an access network 18 to commercial and/or residential buildings 2 housing a gateway 4 (such as a residential or commercial gateway). The access network 18 can represent a group of digital subscriber line access multiplexers (DSLAMs) located in a central office or a service area interface that provides broadband services over optical links or copper twisted pairs 19 to buildings 2. The gateway 4 can use common communication technology to distribute broadcast signals to communication devices capable of presenting the media content. In one embodiment, the gateway can provide the media content directly to one or more display devices without the use of a set top box or other media processor. In another embodiment, the gateway 4 can provide the media device to media processors 6 such as Set-Top Boxes (STBs) which in turn present broadcast channels to media devices 8 such as computers, television sets, gaming consoles managed in some instances by a media controller 7 (such as an infrared or RF remote control, gaming controller, etc.). The exemplary embodiments contemplate home networks that have display devices without any set top boxes; home networks that have display devices with and without set top boxes; and home networks that have display devices which each having a set top box. In one embodiment, the system 1 allows for content to be presented that is aggregated from multiple sources and or delivered using different transport protocols.

The gateway 4, the media processors 6, and/or the media devices 8 can utilize tethered interface technologies (such as coaxial, phone line, or powerline wiring) or can operate over a common wireless access protocol such as Wireless Fidelity (WiFi). With these interfaces, unicast communications can be invoked between the media processors 6 and subsystems of the IPTV media system for services such as video-on-demand (VoD), browsing an electronic programming guide (EPG), or other infrastructure services.

Some of the network elements of the IPTV media system can be coupled to one or more computing devices 30. A portion of the computing devices 30 can operate as a web server for providing portal services over an Internet Service Provider (ISP) network 32 to wireline media devices 8 or wireless communication devices 16 (e.g., cellular phone, laptop computer, etc.) by way of a wireless access base station 17. The base station 17 can operate according to common wireless access protocols such as WiFi, or cellular communication technologies (such as GSM, CDMA, UMTS, WiMAX, Software Defined Radio or SDR, and so on).

The computing devices 30 can be in communication with one or more emergency alert systems or sources 50, including communication stations that have been designated as primary points of distribution. The computing devices 30 can monitor for or otherwise obtain emergency alert messages, including a weather alert, a civil defense alert, an Amber alert, a Presidential alert, or any other emergency alert. In one embodiment, the emergency alert can indicate one or more geographic areas to which the emergency alert applies, such as a street, city, zip code, area code, county, state, region, time zone, nation, or other geographic area. The emergency alert can also include emergency alert information, such as the type of emergency, a degree of urgency associated with the emergency, safety precaution instructions, other emergency alert information, or any combination thereof.

In another embodiment, a satellite broadcast television system can be used in addition to, or in place of, the IPTV media system. In this embodiment, signals transmitted by a satellite 15 carrying media content can be intercepted by a common satellite dish receiver 31 coupled to the building 2. Modulated signals intercepted by the satellite dish receiver 31 can be transferred to the gateway 4 for decoding and distributing broadcast channels to the media devices 8. The media processors 6 can be equipped with a broadband port to the IP network 32 to enable services such as VoD and EPG described above.

In yet another embodiment, an analog or digital broadcast distribution system such as cable TV system 33 can be used in addition to, or in place of, the IPTV media system described above. In this embodiment, the cable TV system 33 can provide Internet, telephony, and interactive media services.

It is contemplated that the present disclosure can apply to any present or next generation over-the-air and/or landline media content services system.

In one embodiment, the computing devices 30 can provide a multicast message to display text overlay and tune to additional audio stream immediately. For example, the duration of tune to audio stream can be included in the message or the system can provide for detuning the audio stream once audio stops playing (e.g., no bandwidth used). In another embodiment, in order to allow the audio to play at the same time the text message is displayed, the display of the message and the tune of the multicast audio stream can be defined to start at some defined time sent in the message. In another embodiment, multiple audio languages can be included in the same audio stream, or in separate audio streams. In yet another embodiment, multiple different displayed text languages can be included in the same message, with the displayed language selected by the preferred language settings on the STB or PC.

The exemplary embodiments contemplate the audio and text portions of the message being transmitted from the same server or group of servers, although separate servers could also be utilized. In one embodiment, a delay can be implemented to allow for synchronization of the audio and text messages. For example, a pre-determined delay can be applied to the first received portion (e.g., the text portion) which allows time for receipt of the other portion (e.g., the audio portion).

In another embodiment, the delay period can be established based on feedback. For instance, a history of STB presentations can be analyzed for a particular region, network, etc., and a delay time can be determined based on the analysis of that history. In another embodiment, the delay time can be dynamic based on a number of factors, including network load, message parameters and so forth.

Figure 2:
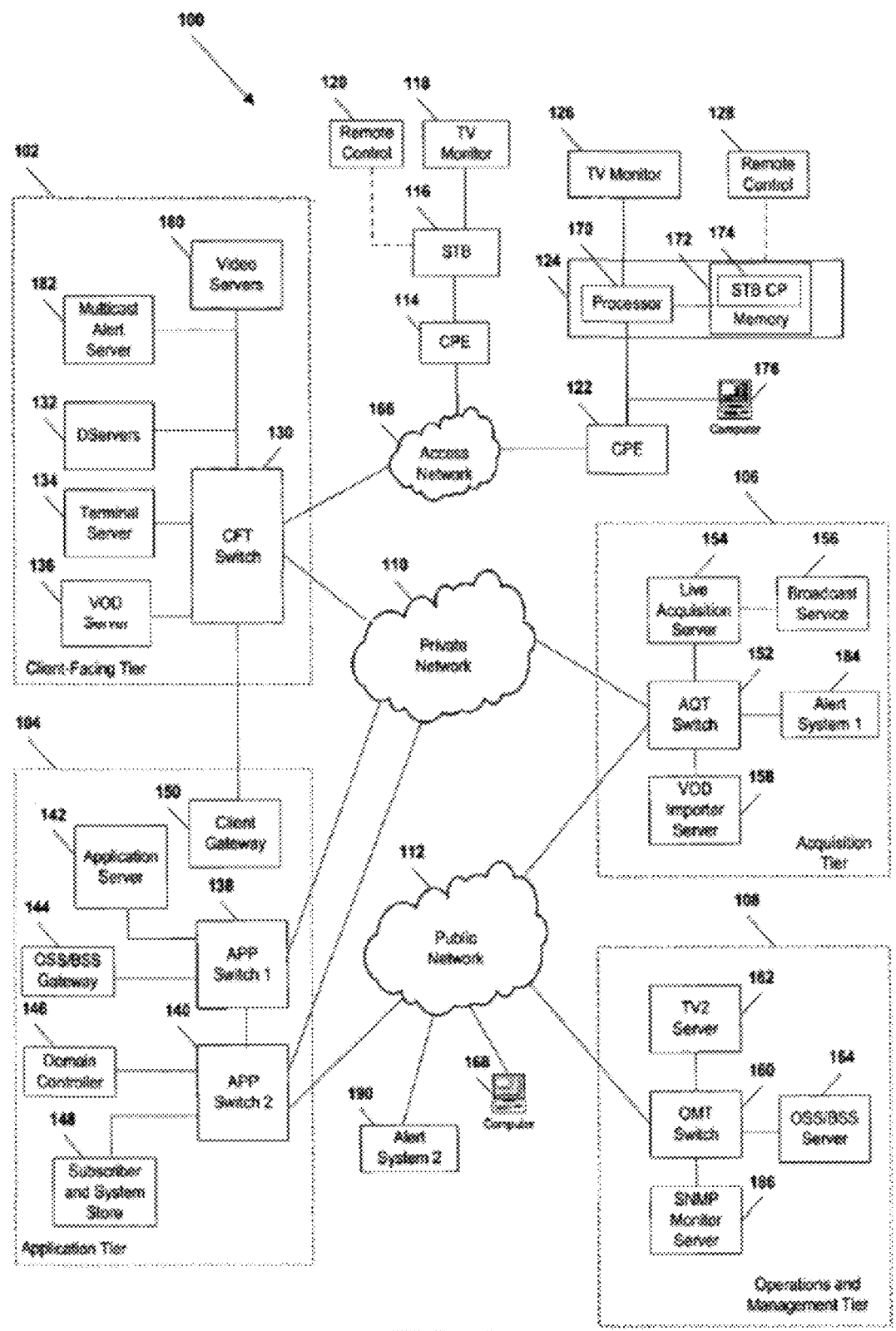

Referring to FIG. 2, another IPTV system 100 can be employed to deliver media content and can be utilized for communicating emergency alerts. Communication system 100 can be overlaid or operably coupled with communication system 1 as another representative embodiment of communication system 100. The system 100 can include a client facing tier 102, an application tier 104, an acquisition tier 106, and an operations and management tier 108. Each tier 102, 104, 106, 108 can be coupled to a private network 110; to a public network 112, such as the Internet; or to both the private network 110 and the public network 112.

The various tiers 102, 104, 106, 108 can communicate with each other via the private network 110 and/or the public network 112. In one embodiment, elements of the application tier 104, including, but not limited to, a client gateway 150, can communicate directly with the client-facing tier 102.

The client-facing tier 102 can communicate with user equipment via an access network 166, such as an IPTV access network. In one embodiment, customer premises equipment (CPE) 114, 122 can be coupled to a local switch, router, or other device of the access network 166. The client-facing tier 102 can communicate with a first representative set-top box device 116 at a first customer premise via the first CPE 114 and with a second representative set-top box device 124 at a second customer premise via the second CPE 122. In one embodiment, the CPE 114, 122 can communicate with computing devices at customer premises, such as the computing device 178 coupled to the second CPE 122. The CPE 114, 122 can include routers, local area network devices, modems, such as digital subscriber line (DSL) modems, any other suitable devices for facilitating communication between a set-top box device and the access network 166, or any combination thereof.

In another embodiment, the client-facing tier 102 can be coupled to the CPE 114, 122 via fiber optic cables. The CPE 114, 122 can be DSL modems that are coupled to one or more network nodes via twisted pairs, and the client-facing tier 102 can be coupled to the network nodes via fiber-optic cables. Each set-top box device 116, 124 can process data received via the access network 166, via an IPTV software platform.

The first set-top box device 116 can be coupled to a first external display device, such as a first television monitor 118, and the second set-top box device 124 can be coupled to a second external display device, such as a second television monitor 126. The first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In another embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In one embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 can be coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100.

The CFT switch 130 can be coupled to one or more video servers 180 that receive video content and transmit the content to the set-top boxes 116, 124 via the access network 166. In one embodiment, the CFT switch 130 can be coupled to one or more multicast alert servers 182 that receive emergency alerts from an emergency alert system (EAS) receiver, such as a first emergency alert system 184 and a second emergency alert system 190, and send multicast emergency alert messages that are based on the emergency alerts to the set-top box devices 116, 124.

In another embodiment, the client-facing tier 102 can communicate with a large number of set-top boxes, such as the representative set-top boxes 116, 124 over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

The application tier 104 can communicate with both the private network 110 and the public network 112. The application tier 104 can include a first application tier (APP) switch 138 and a second APP switch 140. In one embodiment, the first APP switch 138 can be coupled to the second APP switch 140. The first APP switch 138 can be coupled to an application server 142 and to an OSS/BSS gateway 144. In another embodiment, the application server 142 can provide applications to the set-top box devices 116, 124 via the access network 166, which enable the set-top box devices 116, 124 to provide functions, such as display, messaging, processing of IPTV data and VOD material, etc. The application server 142 can provide location information to the set-top box devices 116, 124. In another embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses of corresponding set-top box devices 116, 124.

In one embodiment, the application tier 104 can include a client gateway 150 that communicates data directly to the client-facing tier 102. In this example, the client gateway 150 can be coupled directly to the CFT switch 130. The client gateway 150 can provide user access to the private network 110 and the tiers coupled thereto. The set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. The client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

Content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

The AQT switch 152 can be coupled to a video-on-demand importer server 158 that receives and stores television or movie content received at the acquisition tier 106 and communicates the stored content to the VOD server 136 at the client-facing tier 102 via the private network 110. At the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

The AQT switch 152 can be coupled to a first emergency alert system 184, such as an EAS off-air receiver that receives emergency alerts from a national weather service, an emergency broadcast system, or another emergency alert service. In an alternative embodiment, the first emergency alert system 184 can be coupled to the CFT switch 130, to the multicast alert server 182, or to the terminal server 134. In another embodiment, a second emergency alert system 190 can be coupled to the public network 112.

The operations and management tier 108 can include an operations and management tier (OMT) switch 160 that conducts communication between the operations and management tier 108 and the public network 112. The OMT switch 160 can be coupled to a TV2 server 162. Additionally, the OMT switch 160 can be coupled to an OSS/BSS server 164 and to a simple network management protocol (SNMP) monitor 186 that monitors network devices within or coupled to the IPTV system 100. In a particular embodiment, the OMT switch 160 can communicate with the AQT switch 152 via the public network 112.

The live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In one embodiment, an emergency alert can be received at the first emergency alert system 184. The emergency alert can be a weather alert, a civil defense alert, an Amber alert, a Presidential alert, or any other emergency alert indicating various information. The emergency alert can include text and audio in a number of different languages. The first emergency alert system 184 can communicate the emergency alert to the multicast alert server(s) 182 over the private network via the AQT switch. In another embodiment, an emergency alert can be received at the second emergency alert system 190 from an emergency alert service, for example, via radio transmission. The emergency alert can be received at the second emergency alert system 190 via the public network 112, for instance, from a web browser or web server application operating at a user computing device 168, such as customer computing device, a local law enforcement computing device (e.g., for Amber alerts), a local government agency computing device, or other computing device that can issue emergency alerts related to a specific geographic area. In one embodiment, the second emergency alert system 190 can send a unicast message including the emergency alert to the multicast alert server 182 over the public network 112 via the AQT switch 152 or the second APP switch 140.

The multicast alert server(s) 182 can generate a multicast emergency alert message based on the emergency alert that it received from the first emergency alert system 184, the second emergency alert system 190, or any combination thereof (e.g., in the case of multiple redundant alerts). In one embodiment, the multicast emergency alert message can include data related to a location code. The location code(s) can indicate one or more geographic areas to which the emergency alert received from the first emergency alert system 184 applies. For instance, the location code can indicate streets, zip codes, area codes, cities, counties, states, regions, time zones, nations, or other geographic areas. In another embodiment, the location code(s) can indicate one or more IP addresses of set-top box devices in the intended geographic area(s).

The multicast emergency alert message can also include data related to any emergency alert information included with the emergency alert received from the first emergency alert system 184. In an illustrative embodiment, the multicast alert server(s) 182 can format the multicast emergency alert message to be sent via a multicast-enabled network to a plurality of set-top box devices in multiple geographic areas.

In one embodiment, the access network 166 can be a multicast-enabled network that communicates with a plurality of set-top boxes in multiple geographic areas. For example, the first representative set-top box device 116 can be at a customer premises in a first geographic area, and the second representative set-top box device 124 can be at a customer premises in a second geographic area. The multicast alert server(s) 182 can multicast the multicast emergency alert message to all set-top box devices communicating with the access network 166. In another embodiment, each set-top box device that communicates with the multicast-enabled network can include or otherwise have access to location information.

The location information can indicate a geographic area of the customer premises at which the set-top box device is located, one or more geographic areas for which a user of the set-top box device is to be alerted regarding an emergency, or any combination thereof. For example, the first representative set-top box device 116 can include location information related to a geographic area of the first customer premise, and the second representative set-top box device 124 can include location information related to a geographic area of the second customer premise. In another example, each set-top box device can include location information related to nearby geographic areas, geographic areas of one or more relatives of users of the set-top box device, or additional geographic areas other than that of the customer premise at which each set-top box device is located.

Location information can be included at the set-top box devices 116, 124 in a variety of ways. For example, an installer that installs a set-top box device at a customer premises can enter location information at the time of installation. In another embodiment, the set-top box device can receive the location information from the OSS/BSS server 164, the subscriber and system store 148, or any combination thereof, when a user account associated with a set-top box device is created.

In one embodiment, the set-top box devices 116, 124 can determine upon powering up whether they have current location information, if any. A set-top box device can issue a request via the multicast-enabled network to receive location information. In another embodiment, a server of the IPTV system 100, such as the multicast alert server(s) 182, the application server 142, OSS/BSS server 164, the subscriber and system store 148, or any combination thereof, can determine location information related to the set-top box device, based on an IP address of the set-top box device, a geographic location of the set-top box device, location information selected by a customer associated with the set-top box device, or any combination thereof. The location information can be sent to the requesting set-top box device via the multicast-enabled network.

In another embodiment, when a set-top box device, such as the first representative set-top box device 116, receives a multicast emergency alert message from the multicast alert server(s) 182 via the multicast-enabled network, the set-top box device 116 determines a location code indicated by data included with the multicast emergency alert message and compares the location code with the location information stored at the set-top box device 116. If the location code matches the location information, the set-top box device can present the emergency message.

In one embodiment, when another set-top box device in another geographic location, such as the second representative set-top box device 124, receives the same multicast emergency alert message from the multicast alert server(s) 182 via the multicast-enabled network, the set-top box device 124 can determine the location code indicated by data included with the multicast emergency alert message and compare the location code with the location information stored at the set-top box device 124. If the set-top box device 124 determines that the location code does not match the location information stored at the set-top box device 124, the set-top box device can delete or otherwise discard the multicast emergency alert message received from the multicast alert server(s) 182.

In another embodiment, a computing device can be coupled to customer premises equipment at a customer premises where a set-top box device is located. For example, a computing device 176 can be coupled to the second customer premises equipment 122 at the second customer premises where the second representative set-top box device 124 is located. In an illustrative embodiment, the computing device 176 can download and store location information from the multicast alert server(s) 182 or application server 142 via the multicast-enabled network, the public network, or any combination thereof. The computing device 176 can receive multicast emergency alert messages sent by the multicast alert server(s) 182 via the second customer premises equipment 122. The computing device 176 can compare a location code indicated by data of a multicast emergency alert message and can indicate that a multicast emergency alert message has been received at the second representative set-top box device 124, for example. In another embodiment, the computing device can display emergency alert information, such as text, audio, video, or any combination thereof.

Figure 3:
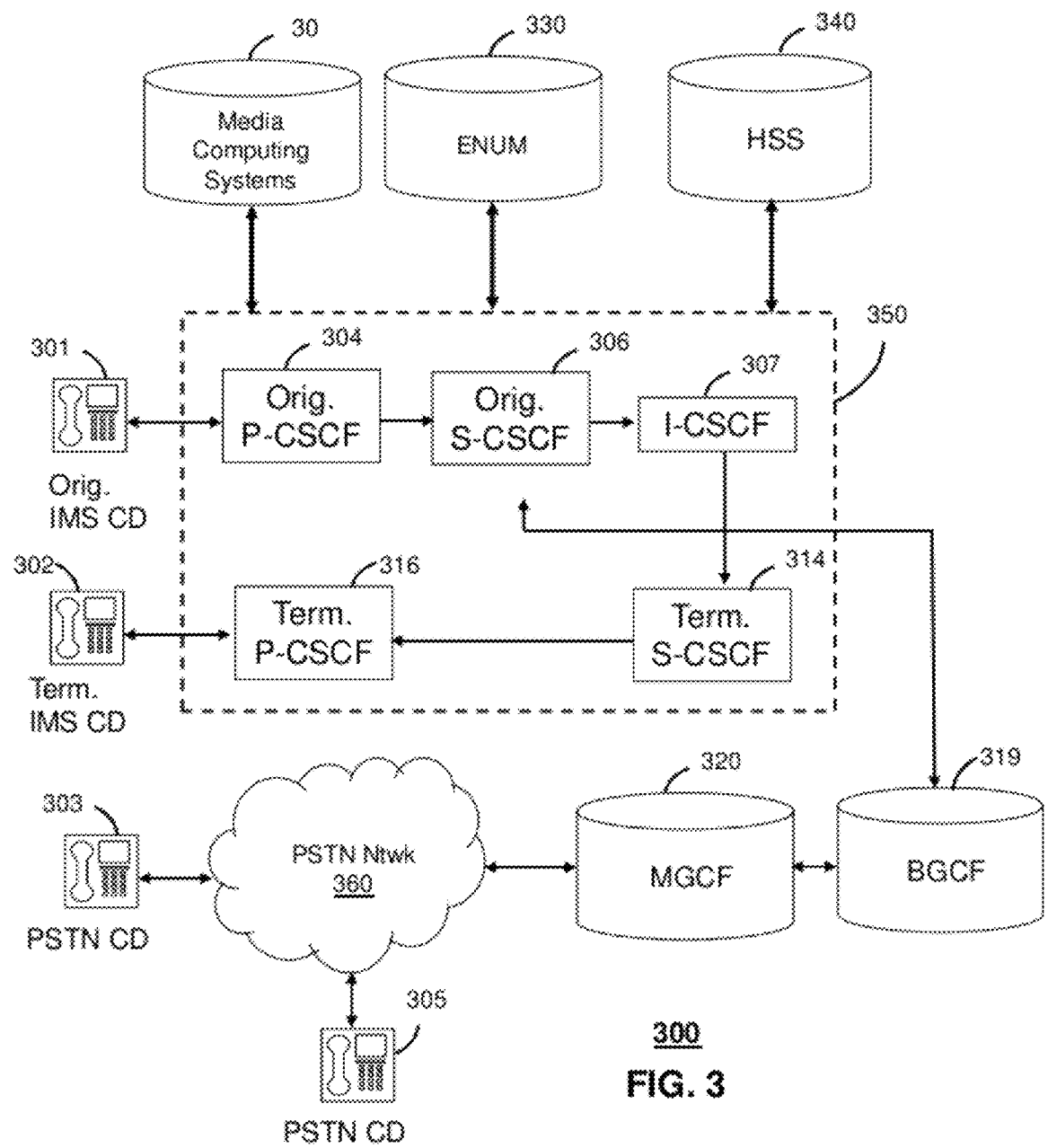

FIG. 3 depicts an illustrative embodiment of a communication system 300 employing an IP Multimedia Subsystem (IMS) network architecture to facilitate the combined services of circuit-switched and packet-switched systems. Communication system 300 can be overlaid or operably coupled with communication system 1 and/or 100 as another representative embodiment of communication system 300.

Communication system 300 can comprise a Home Subscriber Server (HSS) 340, a tElephone NUmber Mapping (ENUM) server 330, and other common network elements of an IMS network 350. The IMS network 350 can establish communications between IMS compliant communication devices (CD) 301, 302, Public Switched Telephone Network (PSTN) CDs 303, 305, and combinations thereof by way of a Media Gateway Control Function (MGCF) 320 coupled to a PSTN network 360. The MGCF 320 is generally not used when a communication session involves IMS CD to IMS CD communications. Any communication session involving at least one PSTN CD the MGCF 320.

IMS CDs 301, 302 can register with the IMS network 350 by contacting a Proxy Call Session Control Function (P-CSCF) which communicates with a corresponding Serving CSCF (S-CSCF) to register the CDs with the HSS 340. To initiate a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit queries to the ENUM system 330 to translate an E.164 telephone number in the SIP INVITE to a SIP Uniform Resource Identifier (URI) if the terminating communication device is IMS compliant.

The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE to the terminating S-CSCF 314. The terminating S-CSCF 314 can then identify a terminating P-CSCF 316 associated with the terminating CD 302. The P-CSCF 316 then signals the CD 302 to establish communications.

If the terminating communication device is instead a PSTN CD such as references 303 or 305, the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD by common means over the PSTN network 360.

The aforementioned communication process can be symmetrical. Accordingly, the terms "originating" and "terminating" in FIG. 3 can be interchangeable. It is further noted that communication system 300 can be adapted to support video conferencing. In addition, communication system 300 can be adapted to provide the IMS CDs 301, 303 the multimedia and Internet services of communication systems 1 and/or 100.

The first and/or second communication systems 1 and/or 100 can be operatively coupled to the third communication system 300 by way of computing systems 30 (or other common communication means) to interchangeably share services between said systems. The first and second communication system 1 and 100 in combination with system 300 can be used for multimedia communication sessions using multiple services providers and using circuit-switched and packet-switched communications.

Figure 4:
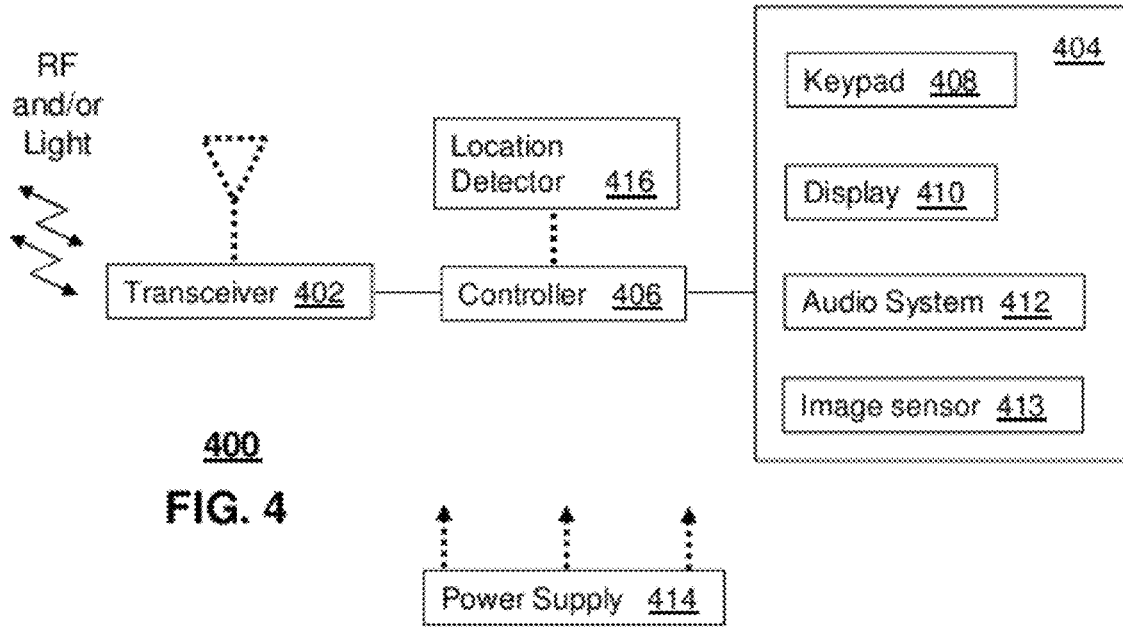
FIG. 4 depicts an illustrative embodiment of a communication device utilized in the communication systems of FIGS. 1-3.

FIG. 4 depicts an exemplary embodiment of a communication device 400. Communication device 400 can serve in whole or in part as an illustrative embodiment of the communication devices of FIGS. 1-3 and other communication devices described herein. The communication device 400 can comprise a wireline and/or wireless transceiver 402 (herein transceiver 402), a user interface (UI) 404, a power supply 414, a location detector 416, and a controller 406 for managing operations thereof. The transceiver 402 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio for hands free operation. The audio system 412 can further include a microphone for receiving audible signals from an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location detector 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 6, the media device 8, or the portable communication devices 16 of FIG. 1, as well as the IMS CDs 301-302 and PSTN CDs 303-305 of FIG. 3. It will be appreciated that the communication device 400 can also represent other common devices that can operate in the communication systems of FIGS. 1-3, such as a gaming console and a media player.

Figure 5:
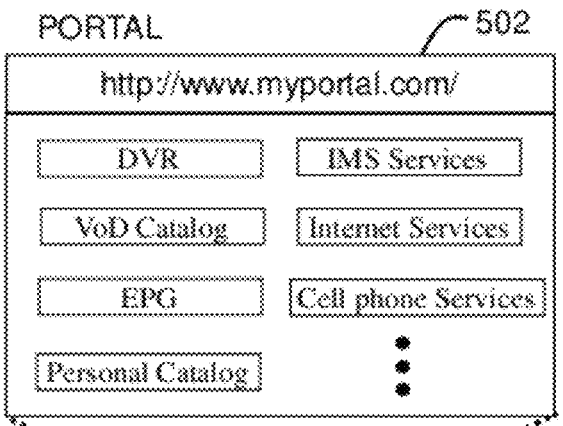
FIG. 5 depicts an illustrative embodiment of a portal interacting with the communication systems of FIGS. 1-3.
Figure 5:
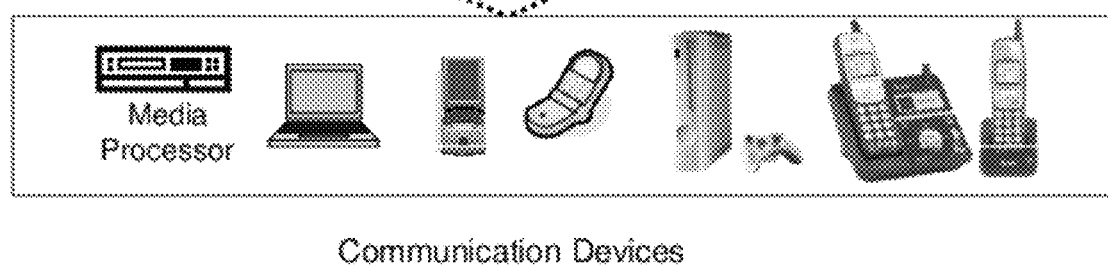

FIG. 5 depicts an illustrative embodiment of a portal 502 which can operate from the computing devices 30 described earlier of communication systems 1, 100 and 200 illustrated in FIGS. 1, 2 and 3. The portal 502 can be used for managing services of communication systems 1, 100 and 200. The portal 502 can be accessed by a Uniform Resource Locator (URL) with a common Internet browser using an Internet-capable communication device such as those illustrated FIGS. 1-3. The portal 502 can be configured, for example, to access a media processor 6 and services managed thereby such as a Digital Video Recorder (DVR), a VoD catalog, an EPG, a video gaming profile, a personal catalog (such as personal videos, pictures, audio recordings, etc.) stored in the media processor, to provision IMS services described earlier, to provision Internet services, to provision cellular phone services, and so on.

Figure 6:
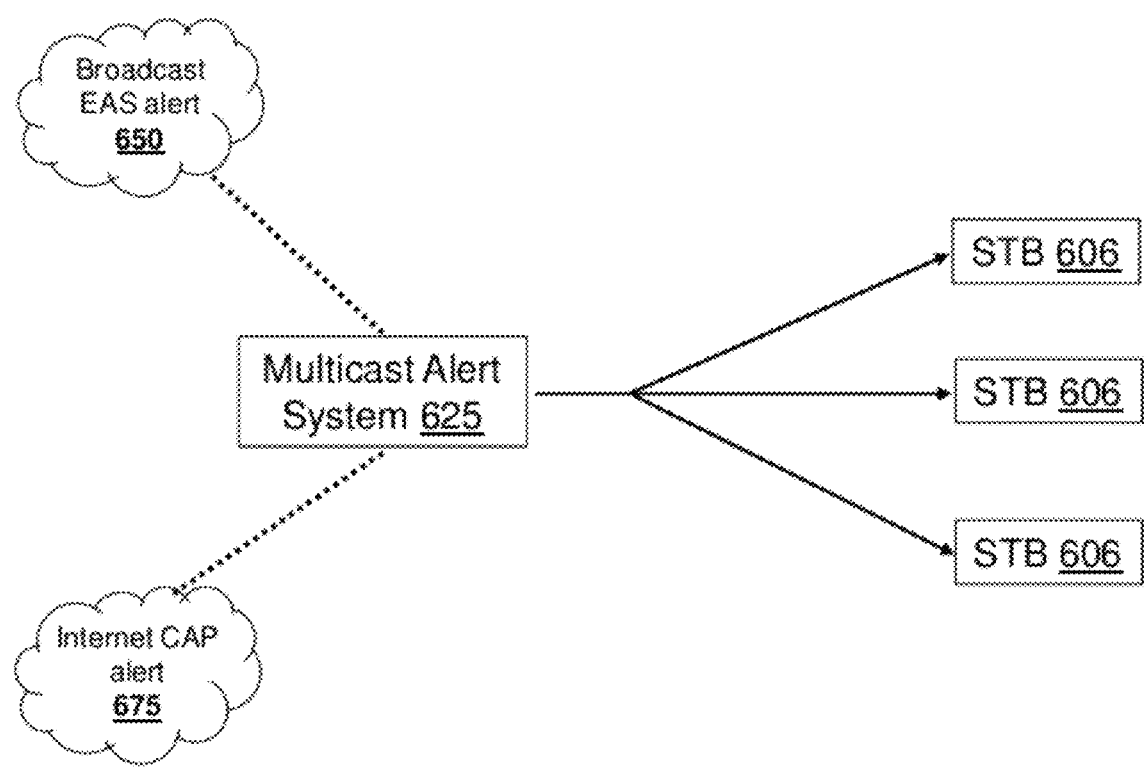
Figure 7:
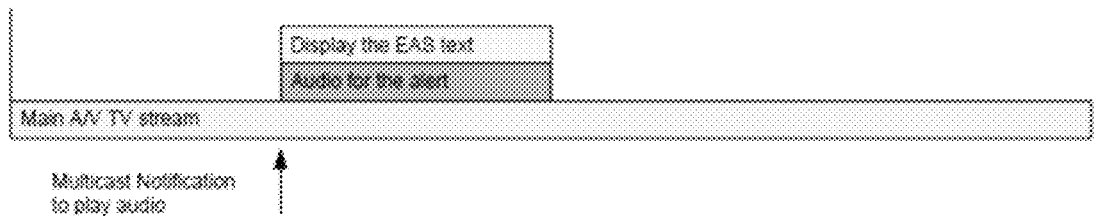
FIGS. 7-11 depict graphical representations along a time line of providing alerts according to the devices and systems of FIGS. 1-6
Figure 8:
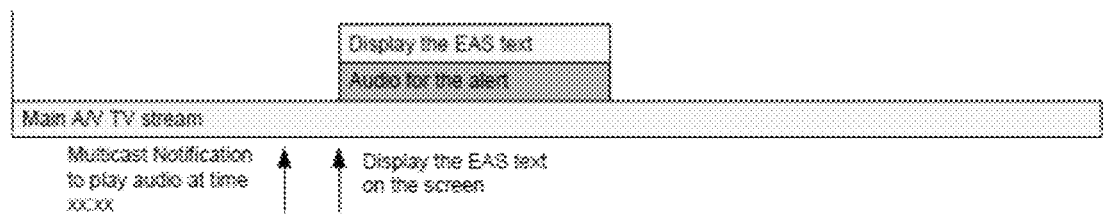
Figure 9:
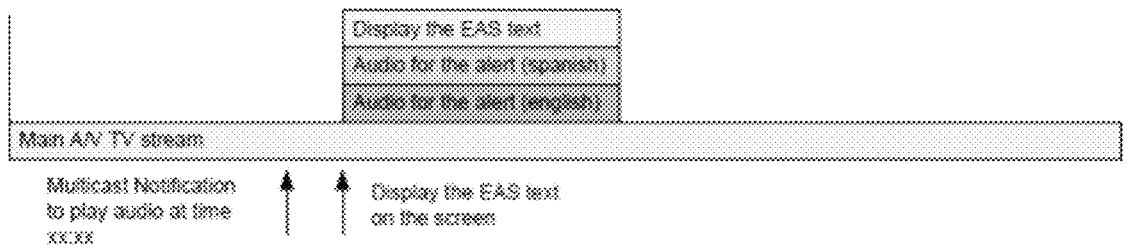
Figure 10:
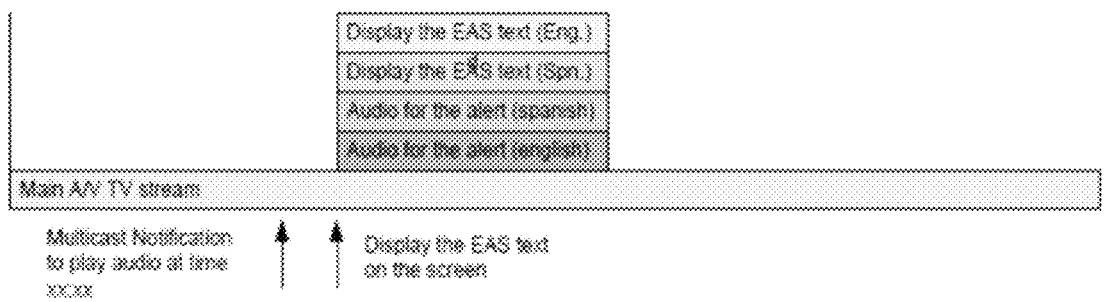
Figure 11:
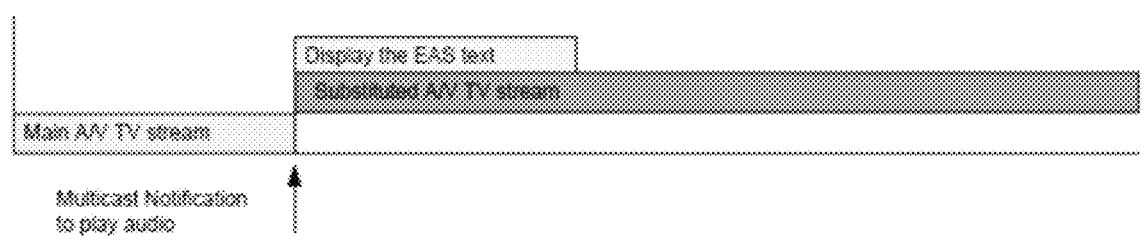

FIG. 6 depicts an illustrative embodiment of a communication system 600 in which emergency alert messages can be distributed via multicast communication. Communication system 600 can be overlaid or operably coupled with communication systems 1, 100 and 200 as another representative embodiment of communication systems 1, 100 and 200. System 600 can include a multicast alert subsystem 625 that can manage distribution of alert messages to various media devices, such as STB's 606. In the exemplary embodiment, set top boxes can receive and present the alert messages (on display devices not shown). However, the present disclosure contemplates various communication devices receiving the multicast alert message. For example, the alert message can be received via multicast by a gateway and provided directly to a display device without utilizing a set top box, in one embodiment. Subsystem 625 can comprise various components for multicasting the alert message, such as one or more servers. The servers can monitor various sources for the emergency alert message, including broadcast emergency alert systems 650 and Internet Common Alert Protocol (CAP) systems 675.

FIGS. 7-11 depict graphical representations of the alerting process along a time line. In alert 700, there is no need for implementation of a delay. All of the audio data is contained in the same multicast stream as the text message. In alert 800, a delay of XX:XX is implemented. This allows for synchronization of the text with the audio, such as where they are received in different multicast streams or there is some other reasons for a time differential in the receipt of the audio and text portions. In alert 900, a delay of XX:XX is implemented. This allows for synchronization of the text with the audio, such as where they are received in different multicast streams or there is some other reasons for a time differential in the receipt of the audio and text portions. In this example, there are separate multicast streams for the audio portion of each language. The STB can then select the desired portion for presentation, such as based on user configuration, monitored viewing history and so forth. In alert 1000, a delay of XX:XX is implemented. This allows for synchronization of the text with the audio, such as where they are received in different multicast streams or there is some other reasons for a time differential in the receipt of the audio and text portions. In this example, there are separate multicast streams for the audio and text portions of each language. In alert 1100, the system can determine that the alert is a Presidential Alert. The text can be displayed while tuning to a different stream.

Figure 12:
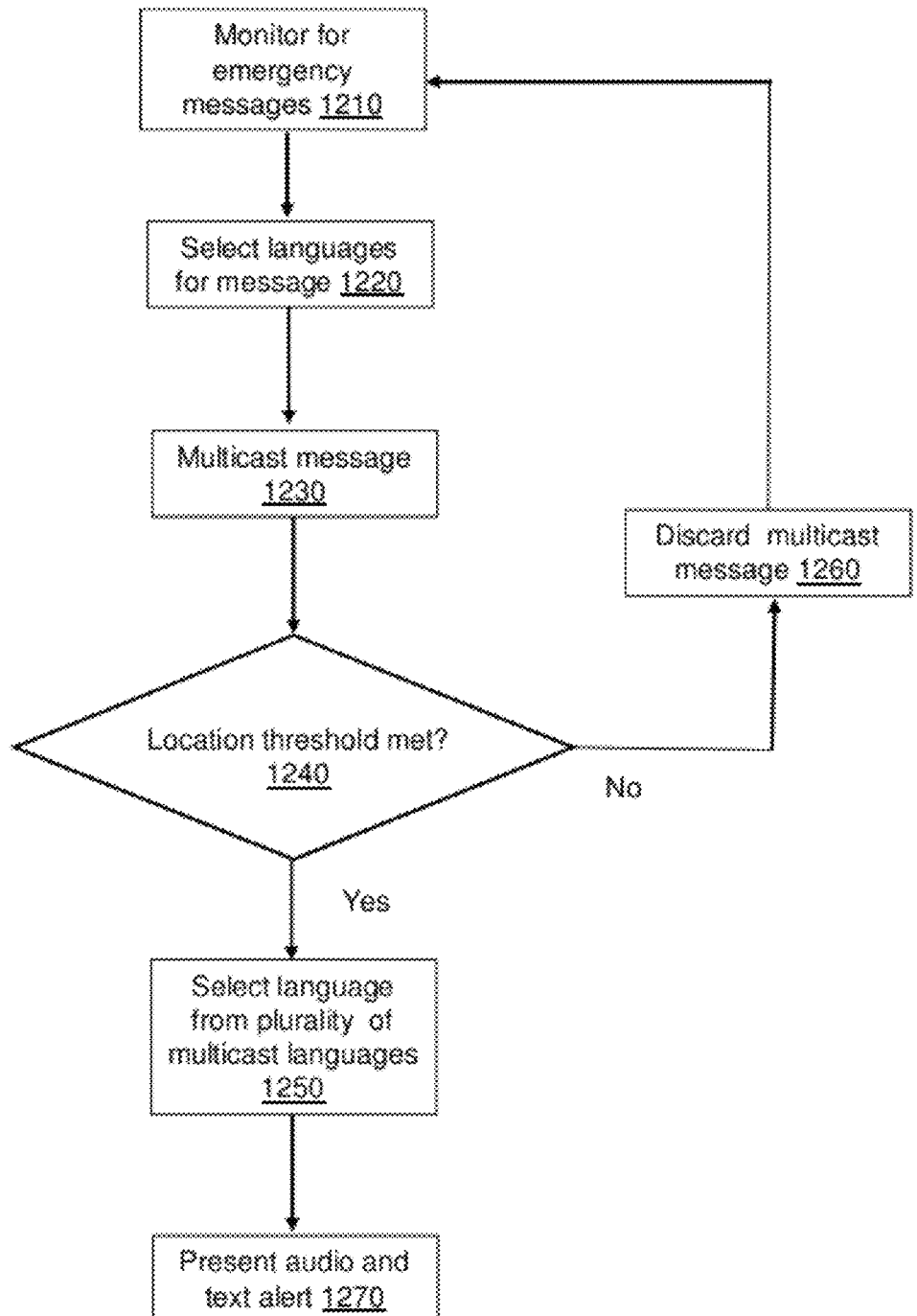
FIG. 12 depicts an illustrative embodiment of a method operating in portions of the devices and systems of FIGS. 1-6.

FIG. 12 depicts an illustrative embodiment of a method 1200 operating in portions of the devices and systems described herein and/or illustrated in FIGS. 1-6. Method 1200 can begin with step 1210 where various emergency sources are monitored for broadcast or generation of an alert message. The monitoring can be performed by various means using various components.

Once an emergency message is detected and retrieved or otherwise accessed, the subsystem 625 can select languages in which the text and audio information representative of the emergency message is to be delivered, at step 1220. In one embodiment, the selection can be based on a group of received languages and can utilize factors such as demographics associated with the location into which the message is to be distributed, user preferences, and so forth. The subsystem 625 can deliver all or some of the language versions of the emergency message received from the emergency message source. For instance, the subsystem 625 can remove one or more versions of the text and/or audio for language versions that are not applicable to particular set top boxes to which the emergency message is to be delivered. In one embodiment, a list of languages retrieved with the monitored message can be generated and then the text and audio data can be translated into additional languages if desired. In another embodiment, the monitored emergency message can be received in English or another language and translated by the subsystem 625, or another device in communication with the subsystem 625, into each of the selected languages.

In step 1230, an emergency multicast stream can be delivered to a plurality of set top boxes, such as all set top boxes in communication with a particular server, service provider head end office, and so forth. The multicast stream can include text and audio data corresponding to each of the selected languages for the emergency message, location data corresponding to a geographic location that is to receive the emergency information, and scheduling data representing the time, frequency and so forth that the emergency message is to be presented.

In step 1240, if the location data does not correspond to or otherwise match a location of the set top box receiving the multicast message, the multicast message can be discarded (step 1260) and method 1200 can return to step 1210. If on the other hand, the location data corresponds with the location of the receiving set top box then the set top box can begin the process for presentation of the emergency information. In step 1250, the set top box can select audio and text data with a desired language from the plurality of languages that have been delivered. The selection of the language can be based on a number of factors using a number of techniques. For example, user preferences can be provided such as in a user profile or at the time of installation of the set top box. In another embodiment, viewing habits and behavior can be monitored to determine a preferred language, such as a viewer who has a history of viewing a foreign language channel. This type of information and techniques can also be used by the subsystem 625 in selecting the plurality of languages that are to be multicast to the plurality of set top boxes. In step 1270, the set top box can then present the text and audio versions of the alert message according to the schedule data. The set top box can utilize the schedule data to determine the play schedule for the messages. The set top box can also synchronize the presentation of the audio and text versions of the message.

Upon reviewing the aforementioned embodiments, it would be evident to an artisan with ordinary skill in the art that said embodiments can be modified, reduced, or enhanced without departing from the scope and spirit of the claims described below. In one embodiment, the set top box can perform translations of all or a portion of the audio and text data in order to perform error correction. For instance, if a German version of a text message is missing several words then the set top box can translate a portion of another language version (e.g., English version) into the German version of the text message and correct the error (i.e., insert the missing words). The particular portion of the text message that is missing or that needs error correction can be determined based on a number of techniques, including metadata provided with the multicast stream, time estimates based on a length of the message and a position of the missing words, and so forth. In one embodiment, the server can reduce or eliminate error correction data (e.g., Forward Error Correction data) in the multicast stream due to the ability of the receiving device (e.g., the set top box) to perform error correction through translation. The amount of the reduction of error correction data can be determined based on the number of different languages that are being multicast, since the more languages that are used can result in more redundant data (after translation) being available to the receiving device.

In another embodiment, the alert message can be delivered to the plurality of set top boxes or other communication devices using networks and/or techniques other than, or in addition to, a multicast over an IPTV network. In one embodiment, one or more features described with respect to the exemplary embodiments herein can be used in a digital broadcast system or other type of network.

In one embodiment, the server can retrieve multiple emergency messages from multiple sources and compare the text and/or audio messages. An alert message can then be generated by the server based on the comparison. In another embodiment, languages can be prioritized and the different languages can be positioned in the data stream according to the prioritization, such as in a fixed bandwidth delivery system. In another embodiment, multiple language versions of the text and/or audio can be simultaneously delivered to one or more of the set top boxes, such as in a variable bandwidth delivery system.

Other components and techniques can be used in combination with, or in place of, the components and techniques described in the exemplary embodiments herein for delivering, processing and otherwise handling emergency message dissemination, such as the components and techniques described in U.S. Pat. No. 7,515,036 issued on Apr. 7, 2009, the disclosure of which is hereby incorporated by reference.

In one embodiment, default languages (e.g., English) can be utilized where a language specified by the set top box has not been delivered during the multicast or is otherwise unavailable. In another embodiment, the server can multiplex the audio and text data according to system options such as for streaming versus download and capped versus variable bandwidth. In yet another embodiment, the alert messages can be multicast or otherwise delivered to one or more other communication devices in addition to the set top boxes. For example, the server can multicast the alert messages to set top boxes and other communication devices associated with the set top boxes (e.g., desktop computers and mobile phones that are determined to be associated with one or more of the set top boxes).

Other suitable modifications can be applied to the present disclosure without departing from the scope of the claims below. Accordingly, the reader is directed to the claims section for a fuller understanding of the breadth and scope of the present disclosure.

Figure 13:
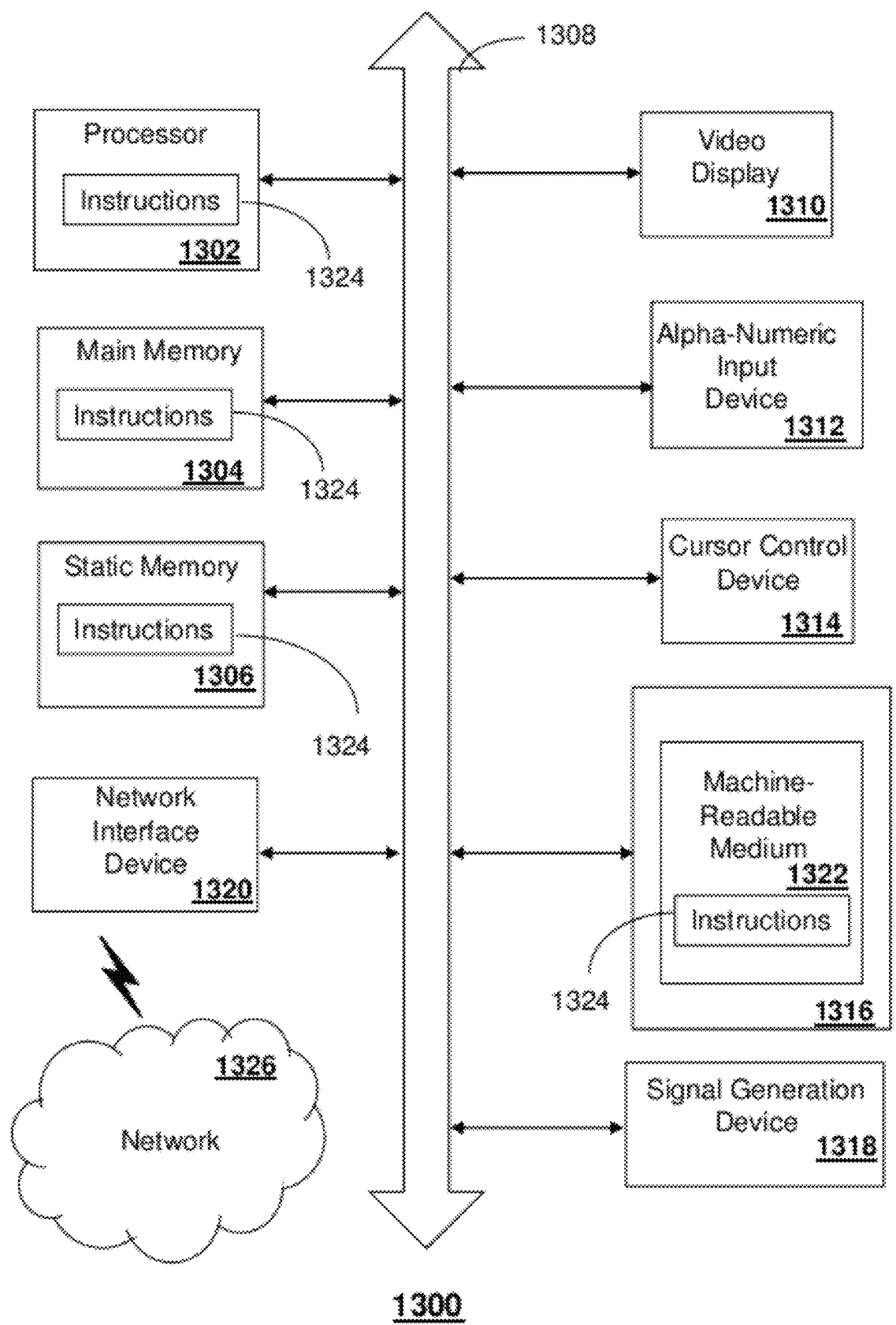
FIG. 13 is a diagrammatic representation of a machine in the form of a computer system within which a set of instructions, when executed, may cause the machine to perform any one or more of the methodologies discussed herein.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
    a memory to store computer instructions: and
    a controller coupled with the memory, wherein the controller, responsive to executing the computer instructions, performs operations comprising:
        monitoring for emergency messages over a broadcast network and over the Internet;
        obtaining an emergency message based on the monitoring, the emergency message comprising text data, audio data, schedule data and location data, wherein the text data and the audio data correspond to a plurality of languages;
        generating an alert message comprising the schedule data, the location data and the plurality of languages of the text and audio data; and
        multicasting the alert message over an internet protocol television network to a plurality of set top boxes, wherein each of the plurality of set top boxes presents a text alert that is synchronized with an audio alert based on the alert message when the location data corresponds with a location of the set top box, wherein each of the plurality of set top boxes presents the text and audio alerts corresponding to a language selected from the plurality of languages, wherein each of the plurality of set top boxes presents the text and audio alerts according to a schedule determined from the schedule data, wherein error correction is performed by the set top boxes based on redundant information in a translation of another language from the plurality of languages, and wherein the translation is performed by the set top boxes.

2. The server of claim 1, wherein a language from the plurality of languages of the text and audio data is not multicast to the plurality of set top boxes.

3. The server of claim 2, wherein the operations further comprise selecting the plurality of languages of the text and audio data for multicasting based on demographic information associated with a region in which the plurality of set top boxes are located.

4. The server of claim 2, wherein the operations further comprise selecting the plurality of languages of the text and audio data for multicasting based on language preference information received from a set top box of the plurality of set top boxes.

5. The server of claim 1, wherein the emergency message is a first emergency message and wherein the operations further comprise:
    obtaining a second emergency message; comparing the first and second emergency messages;
    and generating the alert message based on the comparison of the first and second emergency messages.

6. The server of claim 1, wherein the operations further comprise arranging each language of the plurality of languages of the text and audio data in a multicast data stream.

7. The server of claim 1, wherein the operations further comprise translating the text and audio data into the other language and transmitting the translation in the alert message with the plurality of languages of the text and audio data.

8. The server of claim 1, wherein the operations further comprise multicasting the alert message to a communication device in addition to the plurality of set top boxes.

9. The server of claim 1, wherein the operations further comprise:
    determining a priority of languages for the plurality of languages of the text and audio data; and arranging each language of the plurality of languages of the text and audio data in a multicast data stream according to the priority.

10. A tangible computer-readable storage device comprising computer instructions which, responsive to being executed by a processor of a set top box, cause the processor to perform operations comprising:
    receiving a multicast of an alert message over an interactive television network, the alert message comprising location data and a plurality of languages of text and audio data;
    selecting a first language from the plurality of languages of the text and audio data;
    presenting text and audio alerts in the first language based on the alert message when the location data corresponds with a location of the set top box;
    translating a second language from the plurality of languages of the text and audio data to generate a translation of the second language; and
    performing error correction on the first language using corresponding data from the translation of the second language.

11. The tangible computer-readable storage device of claim 10, wherein the interactive television network comprises an internet protocol television network.

12. The tangible computer-readable storage device of claim 10, wherein the plurality of languages of the text and audio data are selected from a group of languages of the text and audio data based on demographics associated with the location of the set top box.

13. The tangible computer-readable storage device of claim 10, wherein the alert message comprises schedule data, and wherein the operations further comprise: determining a schedule from the schedule data; and presenting the text and audio alerts according to the schedule.

14. The tangible computer-readable storage device of claim 10, wherein the first language is selected based on a user profile associated with the set top box.

15. The tangible computer-readable storage device of claim 10, wherein the operations further comprise monitoring viewing behavior at the set top box, wherein the first language is selected based on the viewing behavior.

16. A method comprising:

obtaining, by a system including a processor, an emergency message comprising emergency information and location data;

obtaining, by the system, text and audio data corresponding to a plurality of languages representative of the emergency message;

generating, by the system, an alert message comprising the location data and the plurality of languages of the text and audio data; and multicasting, by the system, the alert message to a plurality of communication devices, wherein each of the plurality of communication devices presents a text alert that is synchronized with an audio alert based on the alert message when the location data corresponds with a location of the communication device, wherein each of the plurality of communication devices presents the text and audio alerts corresponding to a language selected from the plurality of languages, wherein error correction is performed by the communication devices based on redundant information in a translation of another language from the plurality of languages, and wherein the translation is performed by the communication devices.

17. The method of claim 16, wherein the multicasting is over an internet protocol television network.

18. The method of claim 16, comprising selecting the plurality of languages of the text and audio data for multicasting based on demographic information associated with a region in which the plurality of communication devices are located.

19. The method of claim 18, comprising selecting the plurality of languages of the text and audio data for multicasting based on language preference information received from a communication device of the plurality of communication devices.

20. The method of claim 16, comprising translating the emergency message to obtain the text and audio data corresponding to the plurality of languages representative of the emergency message.

* * * * *